United States Patent [19]

McNeill et al.

[11] Patent Number: 4,876,643

[45] Date of Patent: Oct. 24, 1989

[54] PARALLEL SEARCHING SYSTEM HAVING A MASTER PROCESSOR FOR CONTROLLING PLURAL SLAVE PROCESSORS FOR INDEPENDENTLY PROCESSING RESPECTIVE SEARCH REQUESTS

[75] Inventors: Kevin M. McNeill; Takeshi Ozeki, both of Tucson, Ariz.

[73] Assignee: Kabushiki Kaisha Toshiba, Kawasaki, Japan

[21] Appl. No.: 66,129

[22] Filed: Jun. 24, 1987

[51] Int. Cl.$^4$ .................. G06F 7/06; G06F 13/40; G06F 9/28; G06F 15/16

[52] U.S. Cl. .................. 364/200; 364/231.9; 364/229.2; 364/282.4; 364/259.2; 364/228.5; 364/228.3

[58] Field of Search ... 364/MS File 200, MS File 900, 364/300

[56] References Cited

U.S. PATENT DOCUMENTS

| | | | |
|---|---|---|---|
| 4,442,543 | 10/1984 | Sternberg et al. | 382/49 |
| 4,450,520 | 5/1984 | Hollaar et al. | 364/200 |
| 4,543,630 | 9/1985 | Neches | 364/200 |
| 4,709,327 | 11/1987 | Hillis et al. | 364/200 |
| 4,731,737 | 3/1988 | Watt et al. | 364/200 |
| 4,752,910 | 6/1988 | Yen et al. | 364/900 |
| 4,760,523 | 7/1988 | Yu et al. | 364/200 |
| 4,764,863 | 8/1988 | Silverthorn, III et al. | 364/200 |

OTHER PUBLICATIONS

Mudge et al., "Multiple Bus Architectures", Computer, vol. 20, No. 6, Jun. 1987, pp. 42–50.
Gajski et al., "Essential Issues in Multiprocessor Systems", Computer, vol. 18, No. 6, Jun. 1985, pp. 9–27.
Baer, "Computer Systems Architecture", Computer Science Press, Chapters 10 and 11.
Hillis, "The Connection Machine", Scientific American, Jun. 1987, pp. 108–115.
Kleinrock, "Distributed Systems", Computer, vol. 18, No. 11, Nov. 1985, pp. 90–103.
Hornstein, "Parallel Processing Attacks Real-Time World", Mini-Micro Systems, vol. XIX, No. 15, Dec. 1986, pp. 65–77.
Simpson, "Multiprocessors Use Radical Architectures", Mini-Micro Systems, vol. XIX, No. 7, May 1986, pp. 77–88.

*Primary Examiner*—Archie E. Williams, Jr.
*Assistant Examiner*—Thomas Lee
*Attorney, Agent, or Firm*—Oblon, Spivak, McClelland, Maier & Neustadt

[57] ABSTRACT

A parallel processing search system for searching and updating a database at the request of a host system, including a master processor connected to a host system bus for transfer of information between said master processor and the host system bus; a data bus connected to the master processor; plural slave processors connected to the data bus for independently processing search respective requests under the control of the master processor; a disk drive interface adapted to be connected to a disk which stores a database; and a buffer memory connected to the data bus and the disk drive for storing the database retrieved from the disk and for sequentially placing data from the database on the data bus for match comparison by the slave processors so that a search of the database can be made by the slave processors under the control of the master processor. The buffer memory is also capable of storing updated data obtained from the host system via the master processor so that an updated database can be transferred to the disk memory via the disk drive interface.

3 Claims, 9 Drawing Sheets

DATABASE RECORD FORMAT

SEARCH PATTERN RECORD FORMAT

DATABASE UPDATE RECORD FORMAT

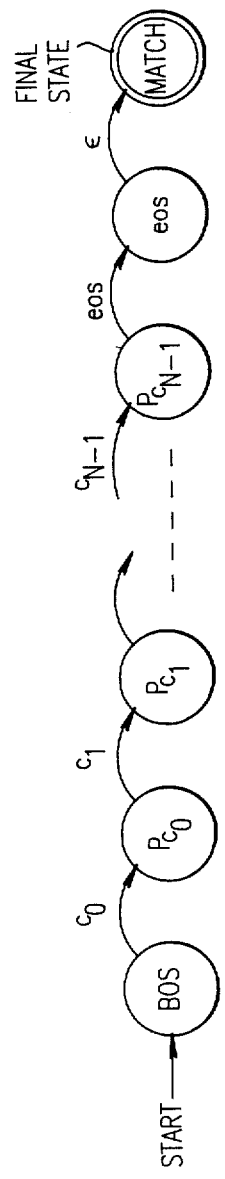
FIG. 8A STATE TRANSITION DIAGRAM FOR PATTERN WITH NO WILDCARD CHARACTERS
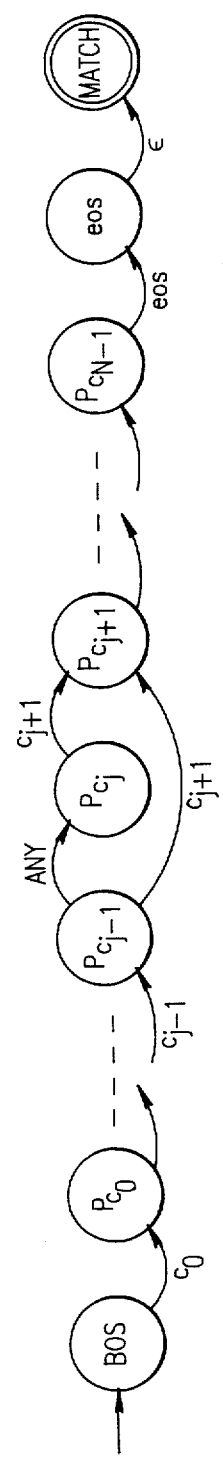
FIG. 8B STATE TRANSITION DIAGRAM FOR PATTERN WITH '&' WILDCARD CHARACTER
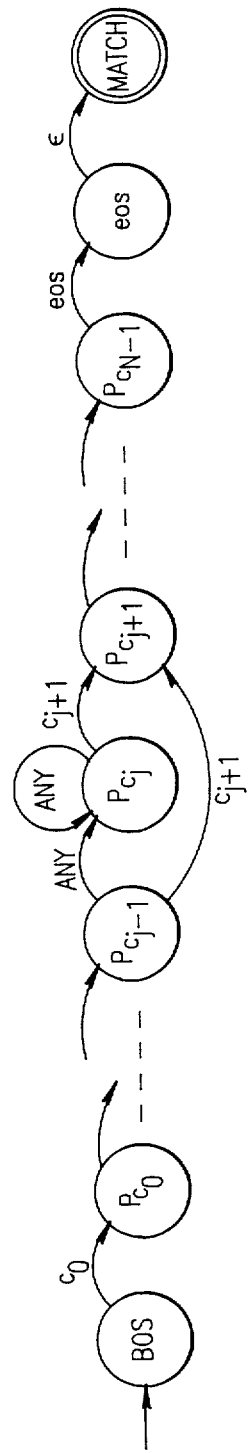
FIG. 8C STATE TRANSITION DIAGRAM FOR PATTERN WITH '*' WILDCARD CHARACTER

PARALLEL SEARCHING SYSTEM HAVING A MASTER PROCESSOR FOR CONTROLLING PLURAL SLAVE PROCESSORS FOR INDEPENDENTLY PROCESSING RESPECTIVE SEARCH REQUESTS

BACKGROUND OF THE INVENTION

1. Field of the Invention

This invention relates to a search system for search and retrieval of information from a database and for updating of the database.

2. Discussion of the Background

Conventional database systems generally employ a single general purpose computer to perform all actions associated with the search and retrieval of information from the database. In such systems the computer may also serve other general timesharing tasks for users besides those of accessing the database. This can lead to delayed responses from the system for both the database users and the general users of the system.

Additionally there exist distributed database systems which are generally networks or general purpose computers communicating over a network such as ethernet. Again, these systems suffer the same problems with response time due to sharing of single processors for several tasks and the additional overhead of network communications. They do have advantage in that the database can be distributed between widely separated nodes if required. However, in a centralized environment the distributed database systems do not find application.

Multi-processor system concepts have been discussed for many years. The gains in the last few years of VLSI technology allowing high-speed processors with a high degree of operational capability to be placed in very small packages has enabled the development of such systems. There are commercial systems which employ multiple processors connected in a variety of topologies. One such example is described by Hillis, "The Connection Machine", Scientific American, June, 1987. The "connection machine" described by Hillis is a parallel processing computer system having 65,536 small processors, each having a local memory and a communications network to allow communication between any of the processors. The system is designed for high-speed image processing, modeling of physical problems and other mathematical problems which benefit from parallel processing. The "connection machine" is designed to solve general problems and may be configured dynamically.

SUMMARY OF THE INVENTION

Accordingly, one object of this invention is to provide a new and improved search system for operation in a centralized environment and which exhibits an improved response time to a search request.

Another object of this invention is to provide a novel search system which is capable of simultaneously processing multiple search requests.

Another object of this invention is to provide a novel search system which enables rapid search of a database, by means of single or multiple keys, with a large number of concurrent searches.

A further object of the present invention is to provide a novel search system which is capable of initiating new search requests while active search is underway.

Yet another object of the present invention is to provide a search system which is capable of adding new records to the database even while searching is underway.

These and other objects are achieved according to the invention by providing a new and improved parallel processing search system including a master processor, plural slave processors connected to the master processor and each other by a data bus for transfer of information therebetween and by control lines for control of the slave processors by the master processor, a shared memory also connected to the data bus, and a disk interface connected to the memory and the control lines, the disk interface including a disk channel for connection to a disk for storage of database records and being controlled by the master processor via the control lines.

According to the invention, the master processor has access to an external host system bus for communication with other processors in a larger host system of which the present parallel processing search system is a component.

Also, the shared memory buffers data from the disk and is accessible by the master processor and the slave processors. The control lines allow the master processor to control the operation of the slave processors and allows the slave processors to signal events to the master processor. The control lines also allow the master processor to control operation of the disk interface and receive event signals from the disk interface.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 8a, 8b and 8c are state transition diagrams illustrating several search algorithms employable by the slave processors of the invention.

DESCRIPTION OF THE PREFERRED EMBODIMENTS

Figure 1:
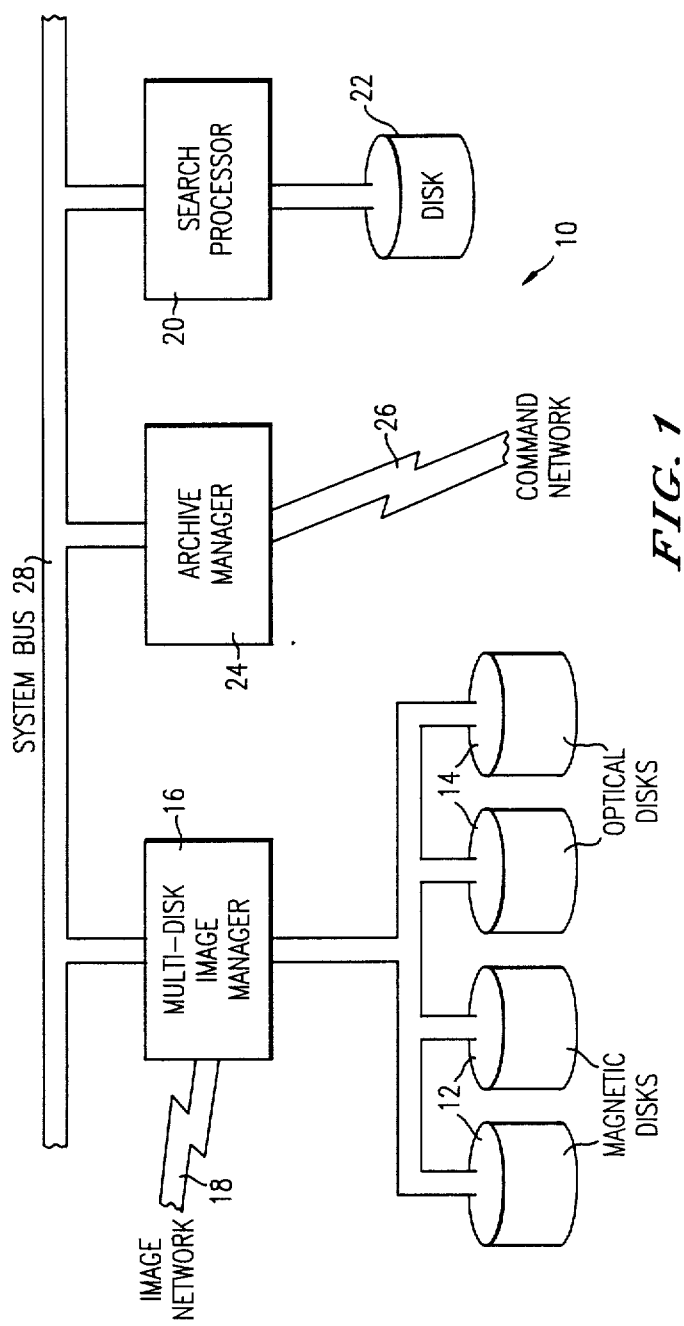
FIG. 1 is a schematic block diagram illustrating the parallel processing search system according to the invention in one intended application as a search processor in a Picture Archiving and Communication System (PACS)

Referring now to the drawings, wherein like reference numerals designate identical or corresponding parts throughout the several views, and more particularly to FIG. 1 thereof, it is first noted that the parallel processing search system according to the invention is intended to be part of a larger host system, for instance a Picture Archiving and Communications System (PACS) 10. The PACS 10 contains an image database made up of a combination of high-speed magnetic disks 12 and slower optical disks 14 all controlled by a disk manager 16. The disk manager 16 is linked through a high-speed image network 18 to devices (not shown) which source and sink the image data. Also contained in the PACS, the search system 20 of the invention manages index files which allow the retrieval of image data by demographic information associated with the image data. The search system 20 maintains this information on a dedicated disk 22. Overall control of the archive system is the responsibility of the archive manager 24, which is linked through a command network 26 to other devices (not shown) in the PACS. Requests on this network are processed by the archive manager 24 through communications with the search system 20 and the disk manager 16. For example, a request arrives at the archive manager 24 asking for images of a patient with id number N and specifying the destination for the images. The archive manager 24 builds a search request record from the following components: a key specifier indicating that the search key is the patient id, the patient id itself and the destination specification. The search record is sent to the search system 20.

Figure 2:
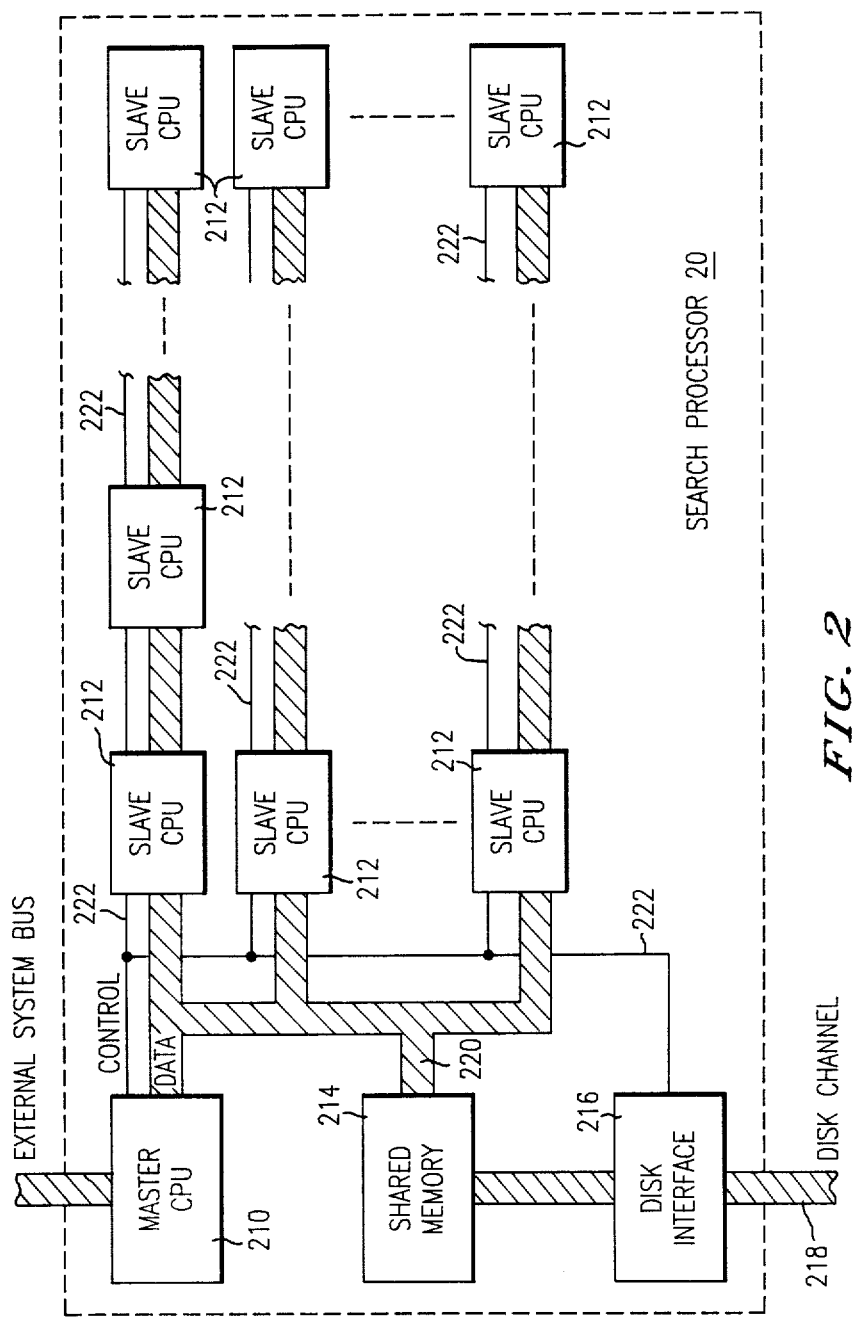
FIG. 2 is a schematic block diagram illustrating the architecture of the parallel processing search system according to the invention.

The search system 20 of the invention is shown in more detail in FIG. 2 to include a master processor 210, plural slave processors 212, a shared memory 214 and a disk interface 216. The system 20 is aimed at applications in which a database must be searched by single or multiple keys, with a large number of concurrent searches. Within the search system 20 the master processor 210 has access to an external system bus 28 (also shown in FIG. 1) for communications with other processors of the host system 10, e.g., PACS, in which the search system 20 is a component. Also, the search system 20 has a disk interface 216 with a disk channel 218 to allow connection to the disk 22 for storage of the database records. A data bus 220 within the system 20 connects the slave processors 212 with the master processor 210 and the shared memory 214. The shared memory 214 is used to buffer data from the disk 22 and is accessible by all the processors 210, 212. Additionally, control lines 222 allow the master processor 210 to control the operation of the slave processors 212 and allow the slave processors 212 to signal events to the master processor 210. These lines 222 also allow the master processor 210 to control the operation of the disk interface 216 and receive event signals from the interface 216.

In operation of the host system 10 in which the parallel processing search system of the invention is a component, such as the PACS shown in FIG. 1, the master processor 210 communicates with the other components of system 10 over the system bus 28.

Figure 3:
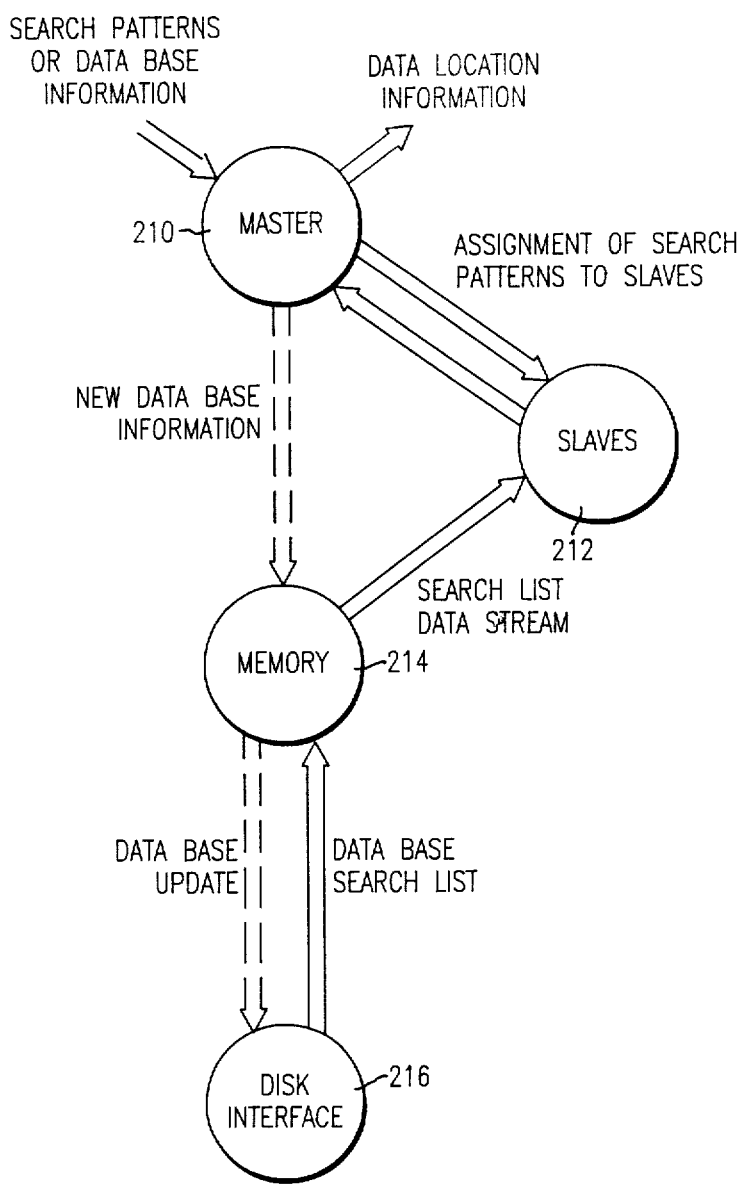
FIG. 3 is a schematic functional diagram illustrating data flow in the search system according to the invention.
Figure 4A:
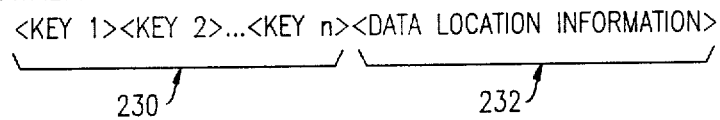
FIGS. 4a, 4b and 4c are respectively representations of a database update record format, search pattern record format and database record format employed in the search system of the invention.
Figure 4B:
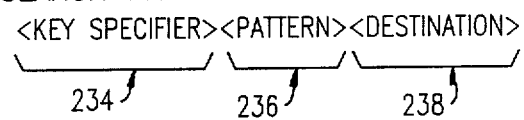
Figure 4C:
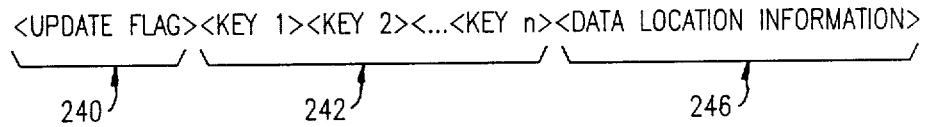

Data flow into and out of the search system 20 takes place through this channel, under the control of the master processor 210. This data flow is illustrated in FIG. 3. From the external system 10, the master processor 210 receives search requests and database update requests. To the external system 10 the master processor 210 returns data location information in a record which is produced as a result of the search operations. The format of these records is indicated in FIGS. 4a, 4b and 4c discussed below. Within the search processor 212, the flow of data is determined by the type of request received by the master processor 210. Database update records are used to add new information to the database and are channeled from the master processor 210, through the memory 214 and on to the disk interface 216 for writing to the disk 22. The slave processors 212 play no role in data base update activity, but may continue searching concurrently. Search requests result in the assignment of an associated search pattern and key specifier to an available slave processor 212. Once a slave processor is assigned a search and thereby becomes active, it watches the search list data stream to detect data which matches the specified keys. The search list data stream consists of database records read from disk 22, through the disk interface 216, into memory 214. These records are then passed to the slave processor 212 for match testing, i.e., comparing of the data with the specified keys. Whenever there is an active slave processor 212 the search list is cycled continuously until the entire list has been processed. Whenever the slave processor 212 slave detects a record with a match in the key field specified by the search request, the data location information portion of the database record is sent to the master processor 210 for transmission to the external system 10. The master processor 210 takes that information, along with destination information for the search request, and places the information on the host system bus 28.

Referring again to FIGS. 1 and 2, when the master processor receives a search request it assigns the execution of the search request to a free slave processor 212. The assigned slave processor 212 then generates an initial state array and waits for the next record from the database location list whereupon it begins attempting to match the specified key. The index of the first record is saved and the slave processor 212 processes record until the same index is seen again, indicating that the entire database location list has been cycled through the slave and the search is complete. Each time a slave 212 successfully matches a key during the search process, a match record is sent via the master processor 210 to the disk manager 16 over the system bus 28. The disk manager 16 uses the location information to extract the image information from the archive and transfer it over the image network 10 to the destination specified in the original request. Transfer of the image information to the destination completes the transaction.

Referring to FIG. 4a, there is shown the data format of data stored in the disk 22. As shown in FIG. 4a, the database record format includes n fields of key information 230 which may be matched, independently or in logical combinations, against the patterns assigned to slaves, and a field of location information 232 returned when a key field is matched by a slave processor 212. This field 232 specifies the location in the host's image database of the image data corresponding to a matched key. In other words, the field 232 is used to identify where in the host system's database image data corresponding to a database record can be found. This field 232 is returned to the host system 10 by the master processor 210 when a match is signalled by a slave processor 212. The host system 10 may then use the data location information 232 to fetch the desired image data from its image database.

In FIG. 4b is shown the search pattern record format also sent by the external host system 10 to the master processor 210 to request a search. The search pattern record format includes a key specifier field 234, a pattern field 236, and a destination field 238, and is transmitted by the host system 10 via the system bus 28 to the master processor 210. Information in the key specifier field 234 controls which key field the slave processor 212 will use when attempting to match the pattern provided in the pattern field 236. Examples of specific key specifier fields 234 are patient name, ID, birthdate, image type, etc., and depend on the particular application of the host system. The pattern field 236 defines the actual pattern in the specified key field which the slave processor 210 will search for in the database list stream. The destination field 238 specifies the destination in the host system for the data location information returned to the host when a slave processor's search produces a match. The destination information 238 is given to the host system 10, over the external bus 28, along with the database location information 232. These two pieces of information allow the host system 10 to retrieve image data within the host system and send it to the desired destination within the host system. The information in the field 238 may also be sent to the disk 22 via the interface 210 and channel 218.

FIG. 4c shows the database record update format sent by the host system 10 to the master processor 210 when the host system has additional data to be added to the database on the disk 22. As shown in FIG. 4c, the database update record format includes an update flag field 240, n fields of key information 242 and data location information 246. The field 240 provides an update flag to the master processor 210 which signals the master processor 210 to process the record specified as an update to the database on the disk 22. The key information 242 specifies n key fields which may be matched, independently or in logical combinations, against patterns assigned to the slaves. The field 246 is used to return to the host system 10 location information identifying the location in the host system's database corresponding to a key field matched by a slave processor 212. The field 246 is returned to the host system 10 by the master processor 210 when a match is signalled by a slave processor 212. The host system 10 may then use this information to fetch the desired data from its database.

In the system data flow of the search system of the present invention, patterns to be matched are programmed into slave processors 212 from data received by the master processor 210; database information (for update) is sent to the disk interface 216 by the master processor 210 via the multiport memory 214; database information (for search) is brought in through the disk interface 216 to the memory 214 and sent to each slave processor 212; and match information is sent by the slave processors 212 to master processor 210.

Figure 5:
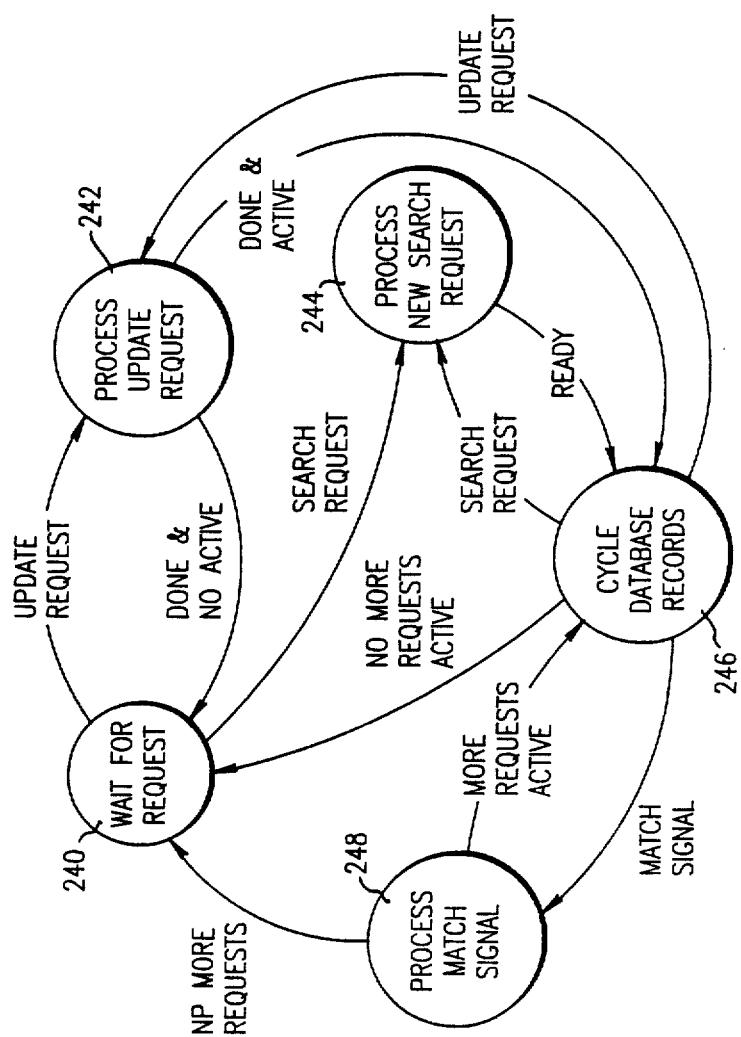
FIG. 5 is a state diagram illustrating operation of the master processor of the invention.

The operation of the master processor 210 is depicted in the state diagram illustrated in FIG. 5. While there are no active requests the processor idles in the WAIT FOR REQUEST state 240. If the processor 210 receives an update request it enters the PROCESS UPDATE REQUEST state 242 in which the update request is acted upon. This involves writing the new database information into the database stored on the disk 22 and updating necessary data structures used by the master processor 210 to reflect the addition of new data. Such data structures include, for example, a directory defining where data is stored on the disk, how many entries are on the disk, etc. New entries are written to the data lists and all affected data structures and parameters are written as well. The slave processors do not participate, but may continue search processing concurrently. Once the update is accomplished the master processor 210 returns to the WAIT FOR REQUEST state 240. If the master processor 210 receives a search request it enters the PROCESS NEW SEARCH REQUEST state 244. In the state 244, the master processor 210 assigns a search pattern from the request to a slave processor 212 and initializes the slave processor 212. The master processor 210 then begins search processing by entering the cycle database records state 246. While in the state 246, the master processor 210 sequentially provides database records to the slave processors 212 for match comparison through control of the memory 214 and disk interface 216. This continues until there are no more search requests active, at which time the master processor 210 returns to the WAIT state 240. During the CYCLE state 246, the master processor 210 may receive and process additional update or search requests. In each case, when the request is processed the master processor 210 returns to the CYCLE state 246 as long as there are active search requests. When the master processor 210 is in the CYCLE state 246 it may also receive match signals from slave processors 212 which have matched their key field against the current database record. This event sends the master processor 210 into the PROCESS MATCH SIGNAL state 248. In this state the master processor 210 formulates a data location record and places it on the host bus 28. If there are more active search requests the master processor 210 then returns to the CYCLE state 246, otherwise it returns to the WAIT state 240.

From the above description, it is seen that the master processor 210 controls operation of the entire search system of the invention including management of database tables, communication with the external host system 10 and operation of the slave processors 212, memory 214 and disk interface 216. In conjunction with its control functions, the master processor 210 interacts with the external host system 10 via registers and/or memory mapped into external systems address space; programs search patterns for each active slave processor in response to requests from the external host system 10; manages transfer of input streams, from database tables or lists, to each slave processor 212; manages updates of the database; and routes match information from slave processors 212 to the host system 10 or the disk interface 216.

Each slave processor 212 may be programmed dynamically with a pattern to be searched in the database. The slave processor 212 sends match information to the external host system 10 via the master processor 210 when the slave processor 212 matches its search pattern. Slave processor 212 awaits pattern programming from the master processor 210. An active slave processor 212 scans the input stream provided by the master processor 210 for the occurrence of its programmed pattern using a search algorithm described hereinafter. The slave processors 212 operate independently, synchronized by beginning of string (BOS) and end of string (EOS) markers, and pass match information to master when each assigned pattern is found.

Figure 6:
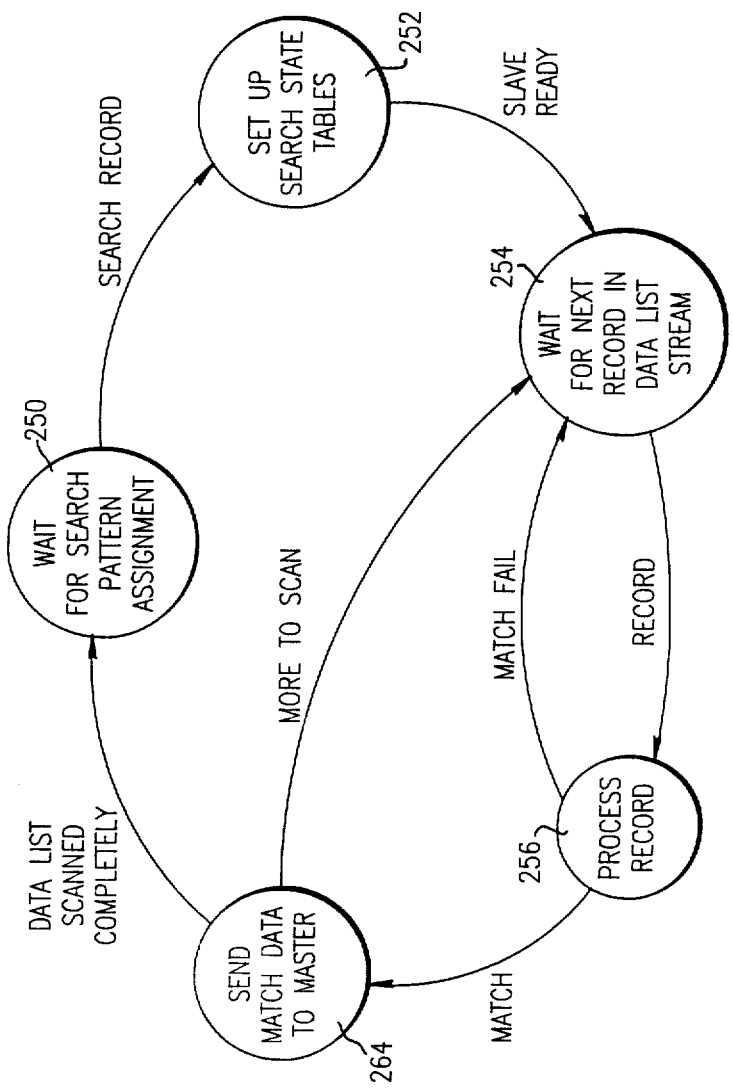
FIG. 6 is a state diagram illustrating operation of the slave processors of the invention.

The operation of a slave processor 212 is depicted in FIG. 6. While a slave processor 212 is not assigned a search pattern, it idles in the WAIT FOR SEARCH PATTERN ASSIGNMENT state 250. When the slave processor 212 receives a search record assignment from the master processor 210 it enters the SETUP SEARCH STATE TABLES state 252. In the state 252, the slave processor 212 takes the search pattern from the master processor 210 and initializes its internal state in preparation for search processing. Once the slave processor 212 has completed its initialization, it enters the WAIT FOR NEXT RECORD IN DATA LIST STREAM 254 state. In the state 254, the slave processor 212 performs initializations which must take place immediately before each record to be processed and then waits for the signal from the master processor 210 indicating the start of the next record. This signal sends the slave processor 212 into the PROCESSOR RECORD state 256. A detailed expansion of this state 256 is shown in FIG. 7.

Figure 7:
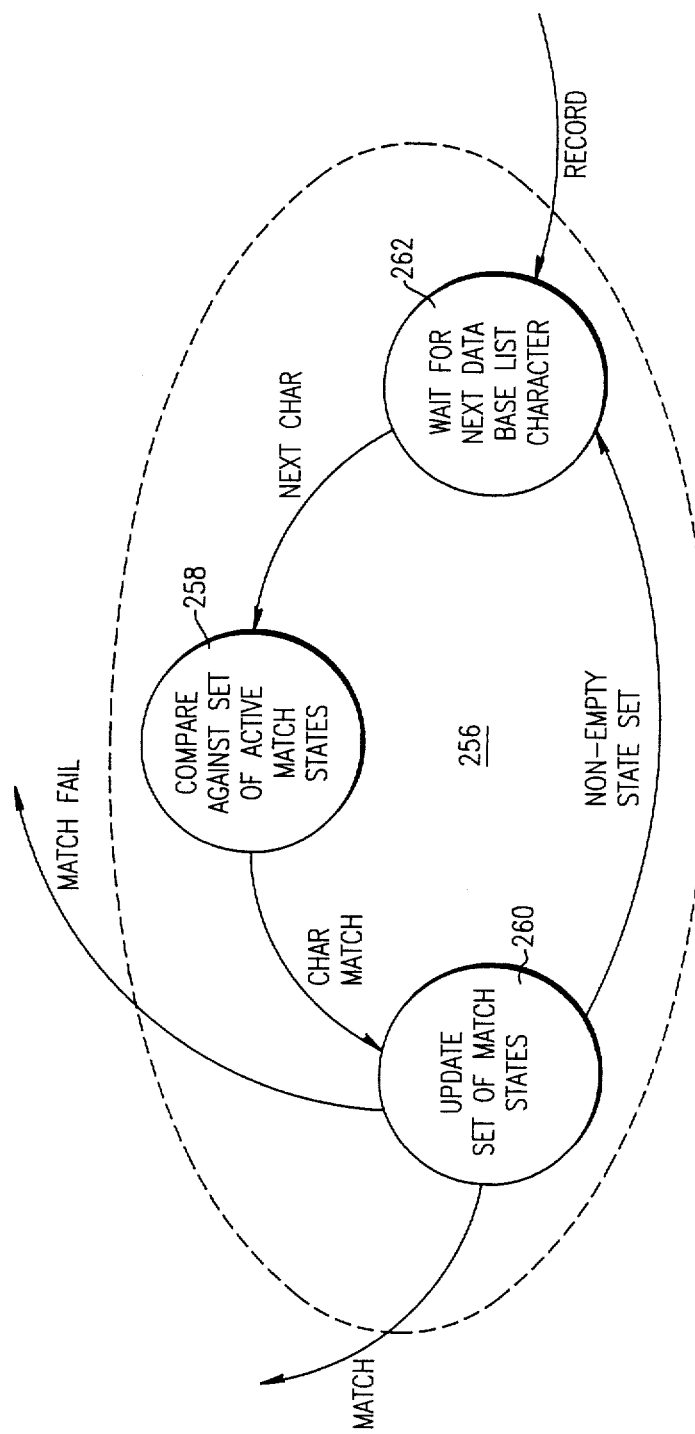
FIG. 7 is a state diagram illustrating in more detail the record processing operation performed by the slave processors of the invention.

As shown in FIG. 7, in the state 256, the processor 212 waits for each character of the record. When a character arrives, it is compared against the set of active match states in state 258. If any of the active states have a label which matches the current character, the set of match states is updated in state 260. If the new set of match states contains the final, or accepting, state, the slave processors 212 search pattern has been matched and the match signal is sent to the master processor 210 in state 264, shown in FIG. 6. If the new set is not empty but does not contain a final state, the slave processor 212 moves to the WAIT FOR NEXT DATABASE LIST CHARACTER state 262. Otherwise, if the new set is empty the slave then waits for the next record to process.

As is evident from FIG. 2, the memory 214 is a multiported memory which may be shared by the master processor 210 and the slave processor 212. Memory 214 has a port for access by the disk system 22 via the interface 216 and the channel 218. The memory is partitioned, with segments reserved for each slave processor 212 as well as the master processor 210. In other words, the memory 214 is accessible over its entire memory space by the master processor 210 and has memory space segments allocated to respective slave processors 212. This allows the master processor 210 to communicate with each slave processor 212 through a segment of shared memory at a fixed location. This shared memory permits the exchange of messages between processors, including intercommunication between slave processors 212. The connection to the disk interface 216 provides DMA access for database information stored on the disk 22.

The architecture above-described allows flexibility in database organization. A simple linear list might be scanned by all slave processors 212 simultaneously. Alternatively, the database may be organized into a tree and each slave processor 212 allowed to search only the branches which may lead to a match. The choice of database organization affects the control algorithm required for the master processor.

Next described, in more detail, is the search algorithm typically employed by the slave processors 212 of the invention. Each slave processor 212 includes RAM memory in which is stored the pattern, obtained from field 236 (FIG. 4b), to be searched. Each active slave processor 212 searches the data input stream on the bus 220 for the occurrence of the stored pattern, this data stream having been loaded into and read out of the memory 214 under the control of the master processor 210. The slave processor 212 may match classes of input by using wildcard characters. For example '*' may be used to match any characters and '&' may be used to match any single character.

The slave processors 212 each implement a nondeterministic finite automation (NFA). An NFA may be denoted by a quintuple of the form:

$$<Q, \Sigma, \delta, q_0, F>$$

where
Q is the set of machine states. This set consists of one state for each character of the pattern, a state for beginning of string, end of string, match and fail. (Machine halts on failure). If the characters in the pattern are labeled $P_{C_0}$ through $P_{C_{n-i}}$ for a pattern string of length N, the $Q = \{BOS, P_{C_0}, P_{C_1}, \ldots P_{C_{N-1}}, EOS, match, fail\}$ $\Sigma$ is the input alphabet, for example the set of ASCII codes.

$\delta$ is the state transition function on $Q \times \Sigma$ to $2^Q$. It is described graphically below in FIG. 3.

$q_0$ is the initial state. For Q shown above, $q_0 = BOS$.

F is the set of accepting states, i.e., the states in which the slave indicates a match has been found. (For Q above, F = {match}).

Examples of the state transition functions of NFA's with set Q (described above) states are shown in FIGS. 8a, 8b and 8c. In FIG. 8a is shown an NFA with no wildcards, wherein $C_i$ denotes a character matching a stored search pattern character $P_{C_i}$, $\epsilon$ denotes a transition which does not require an input, BOS designates the beginning of a string of data, and EOS designates an end of a string of data. FIG. 8b illustrates an NFA with wildcard & (match 0 or 1 of any character) at position $P_{C_{j^x}}$. FIG. 8c illustrates an NFA with wildcard '*' (match 0 or any number of characters) at position $P_{C_j}$. In each of the examples shown in FIGS. 8a, 8b and 8c, the state FAIL is implicit and not shown. Any transition which cannot be made, because input does not match required input, will lead to FAIL unless other states are active. If no states are active, the FAIL state is entered and the machine halts. It should also be understood that a slave processor 212 may implement an NFA which contains combinations of wildcards. Since these machines are nondeterministic there may be several states active simultaneously.

Figure 9A:
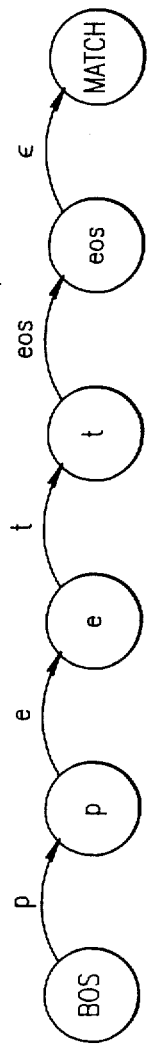
FIGS. 9a and 9b are state transition diagrams of specific examples of searches performed by the slave processors of the invention.
Figure 9B:
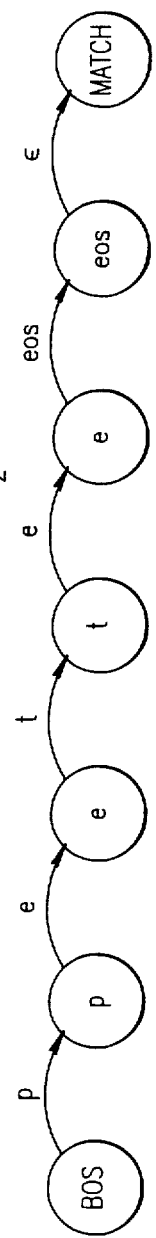

FIGS. 9a and 9b illustrate in more detail specific examples of execution of respective search algorithms by a first slave processor 212, and a second slave processor $212_2$, where the pattern to be matched by processor $212_1$, is "Pet" and the pattern to be matched by processor $212_2$ is "Pete". Where the input stream seen by both processors $212_1$ and $212_2$ is "Pet", the following Table summarizes the operation:

TABLE

| Time | Input | SLAVE $212_1$ STATE | MEM. | SLAVE $212_2$ STATE | MEM. |
|---|---|---|---|---|---|
| $T_1$ | 'P' | BOS | BOS Pet | BOS | BOS Pete EOS |
| $T_2$ | 'e' | P | EOS | P | |
| $T_3$ | 't' | e | | e | |
| $T_4$ | EOS | t | | t | |
| $T_5$ | | Match | | FAIL | |

$T_1$: Each slave processor is initialized to beginning of string. (Search pattern). Both processors match first character of input TABLE-continued

| | | SLAVE 212$_1$ | | SLAVE 212$_2$ | |
|---|---|---|---|---|---|
| Time | Input | STATE | MEM. | STATE | MEM. | stream 'P'. Their states are advanced to state
        P ($\rightarrow$matched 'P').

T$_2$: Both processors match second character of input stream 'e'. Their states are advanced to state e.

T$_3$: Both processors match third character of input stream 't'. Their states are advanced to state t.

T$_4$: Slave 212$_1$ matches end of string and advances automatically to T$_5$. Slave 212$_2$ cannot advance to state e because the next input stream character is EOS rather than e. Thus slave 212$_2$ automatically moves to FAIL state.

T$_5$: Slave 212$_1$ is in the match state, indicating it matched the pattern it was watching for. Slave 212$_2$ is in the FAIL state, indicating it failed to observe its assigned pattern.

Once again, in FIGS. 9a and 9b, as in FIGS. 8a, 8b and 8c, $\epsilon$ denotes that no input is required for state transition, and the FAIL state is implicit. If the set of active states becomes empty, the slave processor will stop processing until the next input record is indicated by the BOS input character.

As above described, the parallel processing search system according to the present invention is designed to perform one component of the task of database access—that of searching for the location of the requested data. The parallel nature of the architecture allows multiple requests to be processed simultaneously. Each slave processor 212 can be searching by different keys and each could, if necessary, search by a different algorithm. A further advantage is that the slave processors 212 could be allowed to handle multiple requests. This would slow down the operation of the processor somewhat but would allow an even larger number of parallel searches to take place. Another advantage of the parallel architecture is that it provides the capability to initiate new requests while searching is active and the capability to add new records into the database while searching is underway. This flexibility results from the distribution of the search task to the slave processors 212, freeing the master processor 210 to handle new requests while it controls the operation of the slave processors 212.

The separation of the data search from the data access also prevents the access of data from the from slowing down the search process and conversely, prevents the processor intensive search process from slowing down access of information from the database as well as the central host operations. Those operations may include communications over networks and other management tasks, or perhaps general computing tasks.

Obviously, numerous modifications and variations of the present invention are possible in light of the above teachings. It is therefore to be understood that within the scope of the appended claims, the invention may be practiced otherwise than as specifically described herein.

What is claimed as new and desired to be sured by Letters Patent of the United States is:

1. A parallel processing search system for searching and updating a database at the request of a host system, comprising:

a master processor connected to a host system bus for transfer of information between said master processor and said host system bus;

a data bus connected to said master processor;

plural slave processors connected to said data bus for independently processing respective search requests under the control of said master processor, said slave processors also connected to said master processor via control lines, said master processor independently and dynamically programming said slave processors to perform match comparison processing of search patterns based on requests from said host system to said master processor, wherein those slave processors programmed by said master processor perform match comparison processing under the control of said master processor and each programmed slave processor signals said master processor when the search pattern with which the respective slave processor was programmed is matched with data on said data bus;

a disk drive interface connected to a disk which stores a database via a disk channel connecting the disk drive to the disk;

a buffer memory connected to the data bus and the disk drive for storing of the database retrieved from the disk via the disk drive and for sequentially placing data from the database on the data bus for match comparison by said slave processors so that a search of the database can be made by said slave processors, said buffer memory being controlled by said master processor to store update data transferred by said host to said master processor and to transfer an updated database to said disk via said disk drive interface.

2. A parallel processing search system according claim 1, wherein the slave processors each implement a non-deterministic finite automation (NFA).

3. A parallel processing search system according to claim 2, wherein each slave processor implements an NFA denoted by a quintuple of the form:

$$<Q, \Sigma, \delta, q_0, F>$$

where

Q is a set of machine states consisting of one state for each character of the pattern, a state for beginning of string, end of string, match and fail;

$\Sigma$ is an input alphabet;

$\delta$ is a state transition function on QX$\Sigma$ to $2^Q$;

q$_0$ is an initial state; and

F is a set of accepting states in which the slave processor indicates a match has been found.

* * * * *